United States Patent [19]

Mobley et al.

[11] Patent Number: 4,675,377

[45] Date of Patent: * Jun. 23, 1987

[54] PROCESS FOR CONTINUOUS PREPARATION OF POLYPHENYLENE OXIDE IN AGITATED REACTION ZONES

[75] Inventors: David P. Mobley; Thomas J. Fyvie, both of Schenectady, N.Y.

[73] Assignee: General Electric Company, Schenectady, N.Y.

[ * ] Notice: The portion of the term of this patent subsequent to Oct. 16, 2001 has been disclaimed.

[21] Appl. No.: 848,557

[22] Filed: Apr. 7, 1986

Related U.S. Application Data

[63] Continuation-in-part of Ser. No. 710,888, Mar. 11, 1985, abandoned.

[51] Int. Cl.$^4$ .............................................. C08G 65/44
[52] U.S. Cl. ...................................... 528/215; 526/65; 528/212; 528/214
[58] Field of Search ...................... 528/215, 212, 214; 526/65

[56] References Cited

U.S. PATENT DOCUMENTS 4,477,649 10/1984 Mobley .............................. 528/215

FOREIGN PATENT DOCUMENTS 7355996 8/1973 Japan .

OTHER PUBLICATIONS

*Chemical Abstracts*, 81, 50503j, (1974).
*Chemical Abstracts*, 97, (6), 39530A.

*Primary Examiner*—Harold D. Anderson
*Attorney, Agent, or Firm*—William H. Pittman; James C. Davis, Jr.; James Magee, Jr.

[57] ABSTRACT

Polyphenylene oxides are prepared by the catalytic reaction of oxygen with a monohydroxyaromatic compound such as 2,6-xylenol in a continuous-flow tubular reactor containing multiple agitated zones. In the case of a copper catalyst system, it is often preferred to premix the non-gaseous constituents of the reaction mixture in an inert atmosphere, and also to use a reactor with various agitator and zone dimensions in various regions.

23 Claims, 3 Drawing Figures

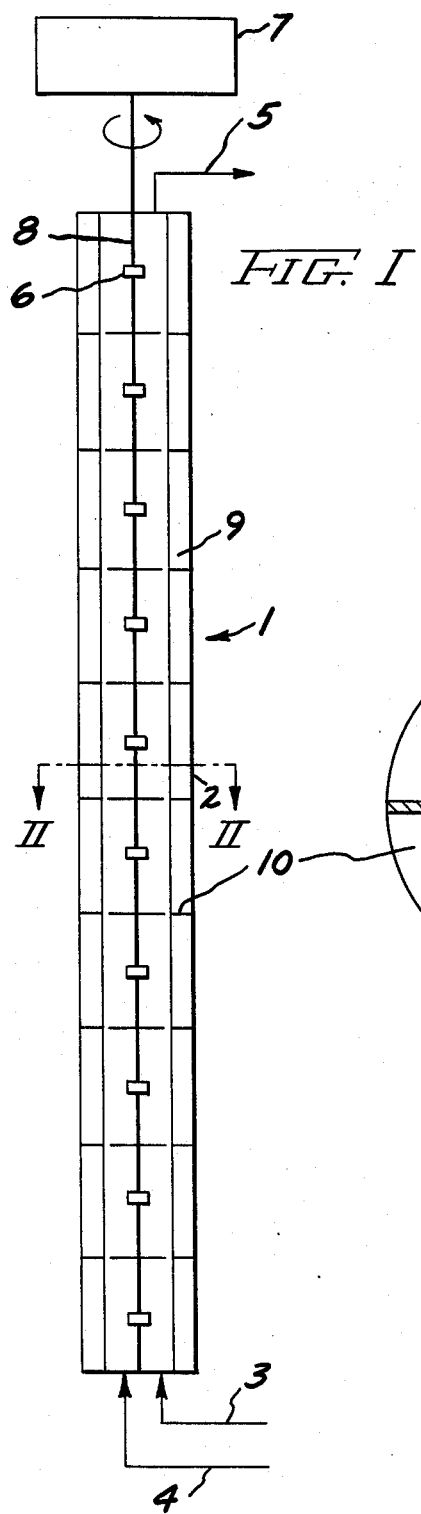

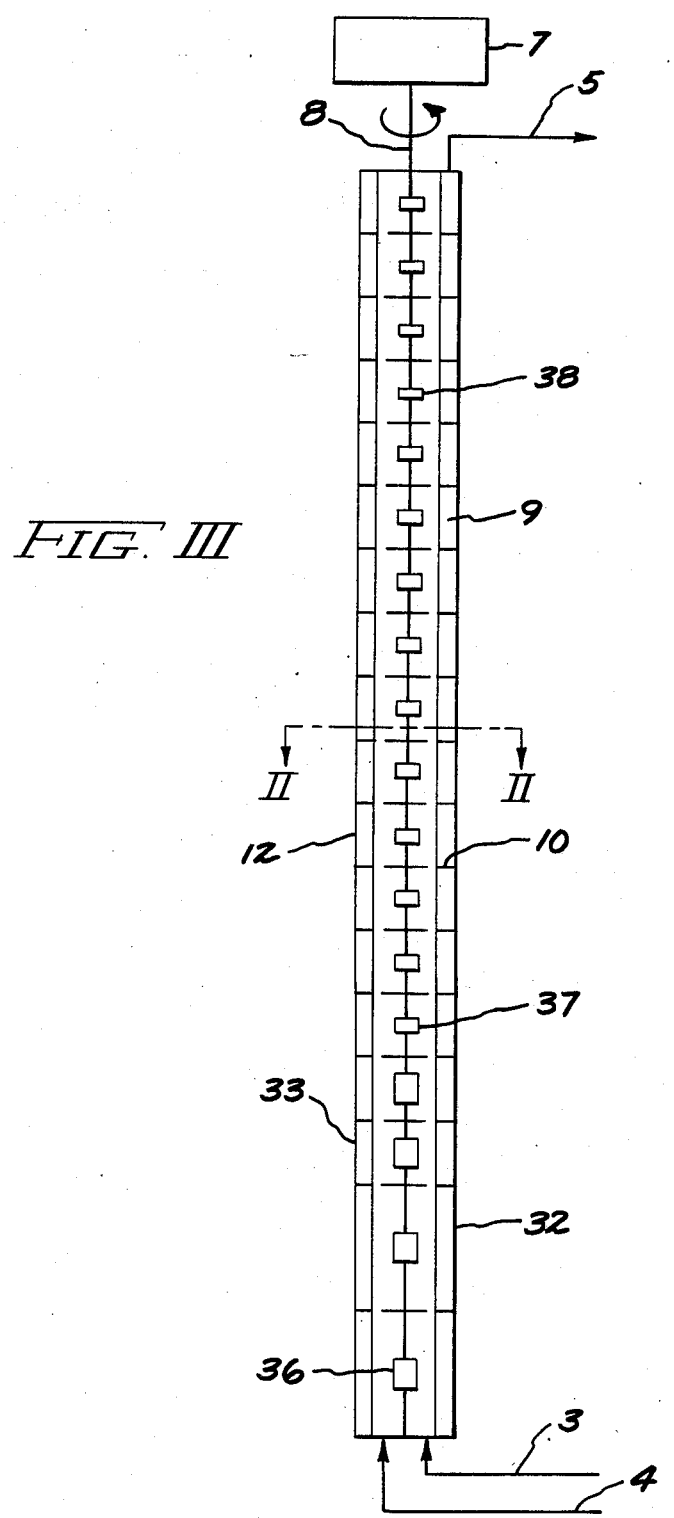
FIG. III

PROCESS FOR CONTINUOUS PREPARATION OF POLYPHENYLENE OXIDE IN AGITATED REACTION ZONES

This application is a continuation-in-part of copending application Ser. No. 710,888, filed Mar. 11, 1985, now abandoned.

This invention relates to the preparation of polyphenylene oxides, and more particularly to a continuous oxidative coupling process for such preparation.

For the most part, the present process for the preparation of polyphenylene oxides (also known as polyphenylene ethers) are batch processes. Reference is made, for example, to the following U.S. Pat. Nos.: 3,306,875 (hereinafter '875), 3,914,266 (hereainfter '266), 4,028,341 (hereinafter '341). A problem associated with batch operation is variation from batch to batch in product quality. In addition, continuous processes frequently offer lower capital and operating costs per unit of production than batch processes, especially in large-scale production.

There have been disclosed various processes possibly adaptable to continuous production of polyphenylene oxides. For example, U.S. Pat. No. 3,306,874 (hereinafter '874) and Japanese Kokai No. 80/21798 (published application No. 80/40613) disclose polymerization processes using three reactors in series. A similar process using two reactors is disclosed in Japanese Kokai No. 73/45600. Three different kinds of column reactors are disclosed in Japanese Kokai No. 74/08597, Japanese Kokai No. 80/55996 and Czechoslovakian Pat. No. 192,278. These reaction systems suffer from various disadvantages including a relatively high catalyst level and an unduly long residence time in one or more reactors.

A principal object of the present invention, therefore, is to provide a continuous process for the preparation of polyphènylene oxides.

Another object is to provide such a process which affords improvements over previously disclosed continuous processes, including lower catalyst level and lower overall residence time in the reaction system.

Other objects will in part be obvious and will in part appear hereinafter.

In its broadest sense, the present invention is an oxidative coupling process for preparing a polyphenylene oxide which comprises catalytically reacting oxygen with at least one monohydroxyaromatic compound, said reaction being conductive continuously entirely in a continuous-flow tubular reactor containing multiple reaction zones, each of which is agitated.

The invention, while not limited to any particular theory, is based on a number of discoveries about the nature of the oxidative coupling reaction leading to the polyphenylene oxide. In the first place, said reaction in its later stages is first order with respect to concentration of the hydroxy group. At that point, of course, said concentration is relatively low, since a large proportion of the available hydroxy groups have been converted to ether groups. Therefore, the reaction is quite slow in these later stages.

In the second place, the oxidative coupling polymerization is essentially an equilibrium reaction. Therefore, if both high molecular weight and low molecular weight polymer are present a leveling effect occurs and the resulting mixture assumes an intermediate molecular weight. It is therefore desirable to segregate monohydroxyaromatic reactant and low molecular weight polymer from high molecular weight product. Under such conditions, the reaction kinetics provide a high molecular weight product with the use of less catalyst, a lower residence time and less oxygen.

The invention takes advantage of these conditions by conducting the reaction in a system which segregates higher molecular weight product, in which hydroxy group concentration is low, from the lower molecular weight material in which it is higher. This segregation is accomplished by the use of a continuous reactor with limited back-mixing, of the type described hereinafter. The result is an increase in the overall rate of polymerization.

Typical monohydroxyaromatic compounds (hereinafter sometimes referred to as "phenols" for brevity) useful in the process of this invention are those having the formula

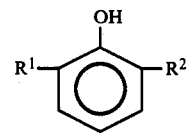

where $R^1$ is a lower primary alkyl group and $R^2$ is a lower primary or secondary alkyl group, the word "lower" meaning that it contains up to 7 carbon atoms. Examples of lower primary alkyl group are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of lower secondary alkyl groups are isopropyl, sec-butyl and 3-pentyl. Preferably, $R^1$ and $R^2$ are straight chain rather than branched. Since the polyphenylene oxides in which $R^1$ and $R^2$ are other than methyl generally have no more desirable properties than those in which $R^1$ and $R^2$ are both methyl, and since 2,6-xylenol is the most readily available and cheapest 2,6-dialkylphenol, its use is preferred. The polyphenylene oxide obtained is then poly(2,6-dimethyl-1,4-phenylene oxide). Other suitable phenols are disclosed in the '874, '875 and '341 patents, the disclosures of which are incorporated by reference herein.

Various catalyst systems have been disclosed for the preparation of polyphenylene oxides, and any of them can be used in the process of this invention. For the most part, they contain at least one heavy metal compound such as a copper, manganese or cobalt compound, usually in combination with various other materials.

A first class of preferred catalyst systems consist of those containing copper. They are usually combinations of cuprous or cupric ions, halide (i.e., chloride, bromide or iodide) ions and at least one amine.

The source of copper can be any of the cupric or cuprous salts disclosed in the '874 and '875 patents. See, for example, '874 from column 3, line 62, to column 4, line 61. The halide ion is preferably bromide, and its source can be any of those disclosed in the '341 patent; particular reference is made to column 8, line 61, to column 9, line 53. For example, it can be an inorganic bromide (except for ammonium bromide, because the ammonium ion can also form a strong complex with copper ions) and can include bromine and hydrogen bromide. Also useful are organic bromine compounds which, under reaction conditions, produce bromide ions. An example thereof is 4-bromo-2,6-xylenol. The only basic requirement is that the bromine compound be capable of supplying a form of bromide ion which is soluble in the reaction mixture. If the bromine compound itself is insoluble, it can still be satisfactory if it forms soluble complexes with the amine constituents of the catalyst or produces a soluble product under oxidative coupling conditions. When metal bromides other than the copper bromides are used, the particular metal used is merely one of choice. Since some of these materials (e.g., cobalt) form complexes with amines, suitable adjustments in the amount of amine used may sometimes be necessary. Because of low cost and ready availability, when using a metal bromide often the alkali or alkaline earth metal bromides are used, e.g., sodium bromide. Since hydrogen bromide will react with amines to form an amine hydrobromide salt and bromine will brominate the phenol and simultaneously produce hydrogen bromide, again adjustments in the amount of amine may be necessary in such situations.

The currently preferred bromide source is HBr, which may conveniently be combined with the copper source as a solution of cuprous oxide in aqueous hydrobromic acid.

The amine constituents of the copper catalyst system may be any of those disclosed in the '874, '875, '266 and '341 patents. Preferably, however, the amines comprise at least one secondary alkylene diamine and at least one tertiary monoamine.

The secondary alkylene diamine may be selected from those disclosed in the '341 patent, especially from column 6, line 44, to column 8, line 11. It generally has the formula

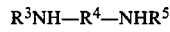

$$R^3NH-R^4-NHR^5$$

wherein each of $R^3$ and $R^5$ is a secondary or tertiary alkyl group and $R^4$ is a divalent hydrocarbon group, and wherein at least two and no more tha three carbon atoms separate the two amino nitrogen atoms and the carbon atoms to which the amino nitrogen are attached are aliphatic. Preferably, there are only two carbon atoms separating the two amino nitrogens. The two or three carbon atoms separating the amino nitrogens can be either acyclic or cyclic carbon atoms. Typical examples of $R^4$ include ethylene, 1,2- and 1,3-propylene, 1,2-, 1,3- and 2,3-butylene, the various pentylene isomers having from two or three carbon atoms separating the two free valences, phenylethylene, tolylethylene, 2-phenyl-1,2-propylene, cyclohexylethylene, 1,2- or 1,3-cyclohexylene, 1,2-cyclopropylene, 1,2-cyclobutylene and 1,2-cyclopentylene.

Typical examples of $R^3$ and $R^5$ include isopropyl and tertiary alkyl (e.g., t-butyl) groups. The substituents on the α-carbon atoms can be straight or branched chain alkyl, cycloalkyl, aryl or alkaryl. Other examples include those set forth in the '341 patent, column 8, lines 2-11, e.g., 2-methyl-2-butyl, etc. The currently preferred secondary alkylene diamine is N,N'-di-t-butylethylenediamine.

The tertiary monoamine can be selected from those disclosed in the '341 patent; specific reference should be made to column 8, lines 12-33. It can be a heterocyclic amine or a trialkylamine characterized by having the amine nitrogen attached to at least two groups which have a small cross-sectional area. In the case of a trialkylamine, it is preferred that at least two of the alkyl groups be methyl with the third being a $C_{1-8}$ primary or $C_{3-8}$ secondary alkyl, and it is more preferred that the third substituent have no more than four carbon atoms. The currently preferred tertiary monoamine is dimethyl-n-butylamine.

At least one secondary monoamine as disclosed in the '874 patent from column 4, line 62 to column 6, line 13 may optionally also be used. In addition to functioning as part of the catalyst and increasing the activity thereof, the secondary amine frequently becomes chemically bonded to the polymer, at least in part, and increases the impact strength thereof, particularly in blends with other polymers such as polystyrenes. It is believed that the increase in impact is achieved by a crosslinking reaction similar to that disclosed in U.S. Pat. No. 4,054,553 at column 6, lines 28-60. The currently preferred secondary monoamines are dimethylamine and di-n-butylamine. The use of dimethylamine for this purpose in polyphenylene oxide preparation is disclosed and claimed in commonly owned U.S. Pat. No. 4,477,651.

It is within the scope of the invention to use copper catalyst systems containing complex salts such as copper(I)-(N,N-di-t-butylethylenediamine) 2,6-xylenoxide, as disclosed and claimed in copending, commonly owned application Ser. No. 572,036, filed Jan. 19, 1984.

Manganese-containing systems constitute a second preferred class of catalysts. They are generally alkaline systems containing divalent manganese and such anions as halide, alkoxide or phenoxide. Most often, the manganese is present as a complex with one or more complexing and/or chelating agents such as dialkylamines, alkanolamines, alkylenediamines, o-hydroxy aromatic aldehydes, o-hydroxyazo compounds, ω-hydroxyoximes (monomeric and polymeric), o-hydroxyaryl oximes and β-diketones. As in the copper-containing systems, secondary amines such as dialkylamines frequently become chemically bound to the polyphenylene oxide product and increase its impact strength.

The following patents are incorporated by reference herein for their disclosures of manganese-containing catayst systems: U.S. Pat. Nos. 3,956, 242, 3,962,181, 3,965,069, 3,972,851, 4,054,553, 4,058,504, 4,075,174; 4,083,828, 4,093,596, 4,093,597, 4,093,598, 4,102,865, 4,110,312, 4,184,034, 4,315,086, 4,335,233, 4,385,168.

Also useful in the method of this invention are cobalt-containing catalyst systems such as those disclosed in U.S. Pat. Nos. 3,455,880 and 4,058,504, the disclosures of which are also incorporated by reference herein.

A phase transfer catalyst may optionally be used in the reaction system as a reaction rate promoter. Useful phase transfer catalysts are disclosed in U.S. Pat. No. 3,988,297, hereby incorporated by reference; specific reference is made to column 2, lines 11-26, and column 3, lines 1-23. The currently preferred phase transfer catalyst (especially for copper-containing systems) is Adogen 464, which is a methyltrialkylammonium chloride wherein the alkyl groups have from 8 to 10 carbon atoms.

One or more solvents may be present in the reaction mixture. The function of the solvent is to provide a liquid phase in which both the phenol and catalyst are soluble. It need not, but preferably does, act as a solvent for the reaction products. Typical solvents for copper-containing systems are disclosed in the '874, '875 and '341 patents. Illustrative solvents for this purpose are toluene and benzene; other inexpensive and readily available commercial solvents may also be used. For manganese systems, solvents of the same type may be used in combination with minor amounts (usually about 5-10% by weight) of lower alkanols (preferably methanol) or the like which maintain the manganese compounds in solution.

According to the present invention, the entire oxidative coupling reaction producing the polyphenylene oxide is carried out continuously in a continuous-flow tubular reactor containing multiple reaction stages, each of which is agitated. Such reactors are known to have limited back-mixing; that is, to approach plug flow. The term "plug flow" is defined in Levenspiel, *Chemical Reaction Engineering*, Second Edition, p. 97, as follows:

> It is characterized by the fact that the flow of fluid through the reactor is orderly with no element of fluid overtaking or mixing with any other element ahead or behind. Actually, there may be lateral mixing of fluid in a plug flow reactor; however, there must be no mixing or diffusion along the flow path.

Thus, "limited back-mixing" in the present context means that there is little or, ideally, no mixing of high molecular weight with lower molecular weight polyphenylene oxide.

A typical reactor used according to this invention is divided into multiple reaction zones by horizontal baffles which restrict the flow of fluid from one stage to a preceding zone. Such a reactor is frequently referred to hereinafter as a "multi-zone reactor". One skilled in the art will recognize that the degree of back-mixing in such a reactor can be controlled by such design variables as the number of zones and the cross-sectional area of the horizontal baffles with respect to the cross-sectional area of the column. Typically the multi-zone reactor is an upright cylindrical vessel. Oxygen is sparged into the multi-zone reactor and each stage is agitated as described hereinafter to provide efficient gas-liquid mixing.

For obvious reasons, the direction of oxygen flow is generally from the lower to the upper end of the reactor. The liquid feed stream flow may be co-current (lower to upper end) or countercurrent (upper to lower end). Co-current flow is frequently preferred since it minimizes back-mixing; however, when it is employed the water formed in the reaction settles to the lower end of the reactor. This water typically comprises about 3% by volume of the reaction mixture. It must be removed since otherwise it will accumulate in large quantities in the lower reactor zones, causing catalyst deactivation.

One way of removing water is to provide a separator vessel or the like into which water of reaction drains from the reactor and from which it may be removed. Another way is to employ a reactor design which maximizes dispersion of water, since water which is efficiently dispersed in the reaction mixture will be carried out with the product stream and thus will not accumulate in catalyst-deactivating amounts by settling to the bottom of the reactor. A suitable design is described hereinafter. With countercurrent flow, water is removed from the reactor with the product stream, at the expense of a somewhat greater degree of back-mixing.

The number of zones in the multi-zone reactor will obviously be greater than one, since one zone would be equivalent to a continuous-flow stirred tank reactor. As one skilled in the art will appreciate, more zones provide more limited back-mixing. It is currently believed that at least two zones will be necessary to achieve any significant limitation of back-mixing, and at least five zones are preferred. The number of zones will generally be set by process economics since increasing the number of zones will increase the cost of the reactor. Practically speaking, a reactor with more than 50 zones is unlikely, and usually about 5-30 zones are acceptable.

Agitation is provided in the reactor so as to ensure good gas-liquid contact between the reaction solution and oxygen being sparged therein. Agitation is most often achieved by turbine agitators; however, other agitation means, such as reciprocating plate agitators and the like, can be used.

The size of the agitators is not a critical aspect of the invention. However, size considerations may be of some concern when co-current liquid flow is employed, by reason of the necessity to deal with the water formed during the reaction.

Therefore, in a preferred embodiment of the invention co-current flow is employed in a reactor wherein the ratio of axial turbine agitator dimension to axial zone dimension is greater in the lower zones than in the upper zones. In general, said ratio in the upper zones, generally the upper 15-25% of the total length of the reactor, will be about 0.1-0.2:1. In the lower zones, generally the lower 15-25%, said ratio will be about 0.2-0.6:1, and in the central zones, comprising the remainder of the reactor length, it will be about 0.15-0.25:1.

In this way, agitation in the lower zones will be sufficiently vigorous to keep the water of reaction dispersed in the mixture and maximum advantage is taken of the high activity of the catalyst in the early reaction stages. In the upper zones, on the other hand, the reaction is nearly complete, the viscosity of the mixture is relatively high and any water formed is inherently retained therein. Therefore, less vigorous agitation is employed and back-mixing is minimized. This reactor design is particularly adapted to the preparation of relatively high molecular weight polyphenylene oxide.

It may also be advantageous under these circumstances to employ somewhat larger reaction zones in the lower portion of the reactor. This is true because the oxidative coupling reaction leading to polyphenylene oxide formation is essentially zero order in its early stages; that is, its rate is essentially independent of reactant concentration. Moreover, in early stages a high concentration of phenol can promote formation of by-products such as tetramethyldiphenoquinone. When larger reaction zones are employed in these early stages, the phenol concentration drops at an early stage in the reactant flow path and by-product formation is minimized.

Most often, this embodiment will utilize zones in about the lower 15-25% of total reactor length which have an axial dimension about twice that of the other zones in the reactor. The ratio of agitator to zone dimension in said zones is most often in the previously stated range and especially about 0.2-0.3:1.

The oxygen flow rate is at least stoichiometric for the conversion, and is generally at least two times stoichiometric to assist in increasing the gas-liquid interfacial area. It does not appear that a flow rate as high as five times stoichiometric substantially assists the reaction and, as will be apparent to one skilled in the art, the use of too high a flow rate could lead to stripping of solvent or liquid catalyst ingredients and, of course, wasting oxygen.

The pressure in the reaction system is typically atmospheric with oxygen being sparged thereinto at one atmosphere. If desired, the oxygen can be diluted with inert gases or air can be used, but the use of pure oxygen is preferred. Sub- or superatmospheric pressures can be used but are seldom if every necessary.

The temperature is typically on the order of about 20°-60° C., preferably 30°-50° C. Cooling and heating of the reactor can be accomplished in conventional manner, e.g., cooling coils internal to the reactor or an external cooling jacket can be used. It is also possible to cool and/or heat various zones differently. For example, it may sometimes be advantageous to cool the initial zones of the reactor to remove heat of reaction while heating later zones to decrease solution viscosity.

The average liquid residence time in the reactor is about 5-90 minutes, preferably 10-60 minutes. Exceedingly low residence times are insufficient for the desired increase in molecular weight, and at exceedingly high residence times catalyst deactivation is encountered.

When a copper catalyst system is employed, it is frequently preferred to mix the non-gaseous constituents (i.e., phenol, components of the catalyst, solvent and phase transfer catalyst when used) under conditions of high phenol concentration. These conditions may result in higher conversion and a decrease in amount of catalyst required. They may be achieved by blending the non-gaseous constituents in the first stage of the reactor. Alternatively, said constituents may be premixed in an inert (e.g., nitrogen or helium) atmosphere to form a homogeneous mixture which is fed to the first stage, as is disclosed in U.S. Pat. No. 4,477,650, the disclosure of which is incorporated by reference herein. It is believed that the ingredients of the copper catalyst system interact with each other more efficiently in the absence of oxidant (i.e., oxygen) and in the presence of a high concentration of phenol, resulting in higher conversion and a decrease in amount of catalyst required when a pre-mixing stage in an inert atmosphere is employed. Such a pre-mixing stage frequently promotes formation of the actual catalyst species under extremely favorable conditions.

Inert pre-mixing is generally neither required nor suitable when a manganese catalyst system is employed, since maximum catalyst activity in such systems is attained by adding the manganese reagent to a phenol-oxygen mixture and maintaining it in continuous contact with oxygen to the extent possible.

Pre-mixing may be effected in a bath or continuous operation. When it is a batch operation, the copper and halide ions should be added last in order that they will be solubilized by complex formation with the amines. It is within the scope of the invention to pre-mix and store a large catalyst batch, using it as required in the polymerization process.

In continuous in-line mixing operations, the order of mixing should be as previously described. When inert pre-mixing in a separate vessel is employed, no special addition order is necessary since each catalyst ingredient is always present in said vessel. Under these conditions, a catalyst species is formed which is highly active under oxidative coupling conditions and which retains high activity for a relatively long period of time, thus continuing to promote effective polymerization for the duration of the polymerization process.

One unique benefit of the process of the present invention is its high flexibility with respect to the use of various proportions of materials, enabling one to prepare polyphenylene oxides of varying molecular weights with flexibility. However, as with all processes, there are certain preferred proportions which are now discussed.

The phenol is generally used in an amount of about 5-60% of total solution weight, preferably 10-40% and most preferably 15-25%. Products which have a commercially desirable molecular weight are most easily obtained in the area of 20% phenol.

Metal (e.g., copper or manganese) ratios are generally 1 mole of metal to about 100-1500 and preferably 250-1000 moles of phenol. In the case of a copper system, the molar ratio of halide (preferably bromide) to copper ions in the catalyst affects catalyst activity, and a ratio of at least about 3.5 moles halide to 1 mole copper is preferred. The upper limit of this ratio is not critical and molar ratios as high as 6 or 12 or more can be used. Currently preferred molar ratios are 4-6 moles Br per mole Cu. The secondary alkylene diamine is generally used in an amount of about 0.4-3 moles, and the tertiary monoamine in an amount of about 10-100 moles and preferably 20-60 moles, per mole of copper.

The molar ratio of phenol to alkali (usually sodium hydroxide or potassium hydroxide) in a manganese system is usually about 5-40:1. It is most often about 10-20:1.

The secondary monoamine, when present, is generally used in an amount up to 3 mole percent based on phenol, with 0.5-2 mole percent being preferred. The phase transfer agent, when present, is typically used in an amount of up to 0.8%, preferably 0.1-0.2%, by weight based on phenol.

It is within the scope of the invention to introduce all of each reagent at the beginning of the system, or to introduce various reagents incrementally at various points in the system. For example, when a pre-mixing stage is employed the entire amount of phenol may be introduced into said pre-mixing stage, or a portion thereof (typically about 20-50% of the total amount) may be added at a later stage. Under these conditions, the proportion of by-product diphenoquinone in the product stream is reduced. Catalyst ingredients can also be introduced incrementally, although replenishment of copper catalyst in major amount in a later zone is not as important when a pre-mixing stage is present as when it is absent. The catalyst ingredients most usually added incrementally are copper, bromide and secondary alkylene diamine. If incremental addition is employed, the following weight percentage amounts of these reagents are typically added in later zones:
Copper—5-25%, preferably 20-25%
Bromide—10-30%, preferably 25-30%
Diamine—20-50%, preferably 30-50%.

The polyphenylene oxides produced by the process of this invention typically have weight average molecular weights of about 5,000 to 75,000, corresponding to intrinsic viscosities of about 0.1-0.75 dl./g. as determined in chloroform at 25° C. The percent product in the final reaction solution is obviously determined by the amount of phenol introduced, since essentially all of said phenol is converted to polymer per the present invention. The product polymer may be isolated from solution by conventional methods such as precipitation by addition of a non-solvent for the polymer.

By the process of the present invention, molecular weight and other parameters can be controlled in simple fashion, with the primary process parameters which affect molecular weight being the ratio of catalyst to phenol, the percent monomer in the solution, the temperature and residence time in the reactor and the degree of agitation.

Reference is now made to the drawings in which

FIG. I is a schematic diagram of one embodiment of a continuous multi-zone limited back-mixing reactor useful in the process of this invention and FIG. III is a similar diagram of a preferred embodiment of such a reactor.

FIG. II is a cross-sectional view of one stage of the reactors of FIGS. 1 and III, along the line II—II.

Reactor 1 as shown in FIG. I has ten zones of equal size, one of which is designated as 2 and shown in cross-section in FIG. II. Oxygen is sparged via line 3, reaction solution is introduced via line 4 and product is withdrawn via line 5. Alternatively, reaction solution may be introduced at the top and product withdrawn at the bottom of the reactor. Centered in each zone is a turbine agitator 6; all such agitators are of equal size and are driven by motor 7 via shaft 8. Each zone is provided with four equally spaced vertical baffles 9 and with a horizontal baffle 10, the latter comprising an outer section 11 attached to the inner wall of reactor 1 and an inner section 12 attached to shaft 8. Between them, outer section 11 and inner section 12 define an annular area 13 of limited back-mixing. Usually, annular area 13 comprises about 2–15%, most often about 4–8%, of the inner cross-sectional area of reactor 1.

FIG. III illustrates the preferred reactor embodiment described hereinabove. It contains 2 zones of larger axial dimension, designated 32, and 16 of smaller dimension, designated 33. Turbine agitators 36, 37 and 38 are of progressively smaller axial dimensions. In other respects, the design of the preferred reactor is the same as that of FIG. I.

The invention is illustrated by the following examples. All percentages are by weight of total solution unless otherwise indicated, and all mole amounts are per 1000 moles of 2,6-xylenol in the original feed solution. Copper and bromide were provided in the form of a $Cu_2O$ solution in 48% aqueous HBr. The following abbreviations are used:
DBEDA—N,N'-di-t-butylethylenediamine
DMBA—dimethyl-n-butylamine
DBA—di-n-butylamine.
Intrinsic viscosities were measured in chloroform at 25° C.

EXAMPLE 1

The apparatus consisted of a multi-zone reactor as shown in FIG. I. It had an internal diameter of 7.6 cm., was 76.2 cm. long and contained 10 identical zones with axial dimensions of 7.6 cm. With reference to FIG. II, inner section 12 had a diameter of 3.8 cm. and annular area 13 had a width of 0.32 cm. The diameter of each turbine agitator 6 was 3.8 cm.; each such agitator had 6 flat blades 0.79 cm. wide mounted vertically on shaft 8 and was located midway between the top and bottom of its zone. Four vertical baffles 9, each 0.64 cm. wide, were equally spaced around the circumference of the vessel. The turbines were rotated at 550 rpm. and the reactor was operated at slightly above ambient pressure (typically 0–5 psig.). The reactor was cooled or heated as necessary by means of a water jacket.

Feed solutions containing 20% 2,6-xylenol in toluene were prepared and fed co-currently with oxygen to the reactor, with the solution feed rate being regulated so as to provide the desired residence time in the reactor.

After steady-state conditions were achieved, the reactor was operated continuously for 3½ hours at an average temperature of 42±2° C. The polyphenylene oxide products were isolated by diluting the solution thereof with one volume of toluene and then with approximately five volumes of methanol, filtering and drying in conventional manner.

EXAMPLES 2-7

The reactor and conditions were similar to those in Example 1, with various differences in mole ratios, proportions, addition rates and residence times.

The reaction parameters and the properties of the polyphenylene oxide products of Examples 1–7 are listed in Table I.

TABLE 1

| | Example | | | | | | |
|---|---|---|---|---|---|---|---|
| | 1 | 2 | 3 | 4 | 5 | 6 | 7 |
| Moles: | | | | | | | |
| DBEDA | 3.3 | 3.3 | 3.3 | 2.2 | 2.2 | 2.2 | 2.2 |
| DMBA | 67 | 44 | 44 | 44 | 44 | 44 | 44 |
| DBA | 14 | 14 | 14 | 9.5 | 9.5 | 9.5 | 9.5 |
| Cu | 1.7 | 1.7 | 1.7 | 1.1 | 1.1 | 1.1 | 1.1 |
| HBr | 8.9 | 8.9 | 8.9 | 5.9 | 5.9 | 5.9 | 5.9 |
| Adogen 464, % | 0.03 | 0.02 | 0.02 | 0.02 | 0.02 | 0.02 | 0.02 |
| Liquid residence time, min. | 44 | 47 | 47 | 45 | 24 | 38 | 60 |
| Oxygen feed rate, SCFH | 3.5 | 3.5 | 4.0 | 3.3 | 4.4 | 3.3 | 3.3 |
| Product: Int. vis., dl/g. | 0.34 | 0.28 | 0.30 | 0.13 | 0.06 | 0.11 | 0.17 |
| Mw | 32,000 | | 22,700 | | | | |

EXAMPLES 8-9

The apparatus consisted of a multi-zone reactor similar to that of FIG. I, except that the reaction solution was introduced at the top rather than the bottom and countercurrent oxygen feed was employed. The feed solutions contained 44 moles of DMBA and 10 moles of DBA and were prepared by mixing the ingredients thereof in a pre-mix vessel under nitrogen, with the copper-bromide solution being added last. The feed solution contained 20% 2,6-xylenol and 0.03% Adogen 464. It was continuously pumped into the reactor so as to provide a residence time of 50 minutes, and oxygen was fed to the reaction at 3.5 SCFH. The polyphenylene oxide product was isolated as in Examples 1–7.

The other relevant parameters and properties of the polyphenylene oxides obtained are listed in TABLE II.

TABLE II

| | Example 8 | 9 |
|---|---|---|
| Moles: | | |
| DBEDA | 1.9 | 2.8 |
| Cu | 1.2 | 2.8 |
| HBr | 6.6 | 14.9 |
| Temp., °C. | 30–40 | 35–43 |
| Int. vis. of product, dl./g. | 0.32 | 0.40 |

EXAMPLE 10

The apparatus consisted of a multi-zone reactor as shown in FIG. III. The dimensions were identical to those of the reactor of Examples 1–9 except as follows: Two zones 32 had axial dimensions of 7.6 cm. and 16 zones 33 had axial dimensions of 3.8 cm. Four agitators 36 had blades with axial dimensions of 1.91 cm., ten agitators 37 had 0.79-cm. blades and four agitators 38 had 0.48-cm. blades.

The feed solution was identical to that of Example 9 and was prepared in the same manner and fed co-currently with oxygen to the reactor, with the solution feed rate being regulated so as to provide a residence time of 47 minutes. The oxygen flow rate was 4.0 SCFH, and the reactor temperature range was maintained from 33° C. at the inlet by cooling to 40° C. at the outlet by heating. After steady-state conditions were achieved, the reactor was operated continuously for 4 hours. The polyphenylene oxide product had an intrinsic viscosity of 0.59 dl./g., corresponding to a weight average molecular weight of 54,000.

What is claimed is:

1. A process for preparing a polyphenylene oxide which comprises catalytically reacting oxygen with at least on monohydroxyaromatic compound, said reaction being conducted continuously entirely in a continuous-flow tubular reactor containing multiple reaction zones, each of which is agitated.

2. A process according to claim 1 wherein the reactor contains at least five zones.

3. A process according to claim 2 wherein the reaction temperature in the reactor is about 20°-60° C.

4. A process according to claim 3 wherein the monohydroxyaromatic compound is 2,6-xylenol.

5. A process according to claim 2 wherein the reaction is conducted in an alkaline system in the presence of a manganese complex catalyst.

6. A process according to claim 2 wherein the reaction is conducted in the presence of a catalyst comprising a combination of copper ions, halide ions and at least one amine.

7. A process according to claim 6 wherein the non-gaseous constituents are pre-mixed in an inert atmosphere to form a homogeneous mixture which is fed to the first stage.

8. A process according to claim 6 wherein co-current flow of feed solution and oxygen is employed.

9. A process according to claim 8 wherein water is removed from the lower end of the reactor.

10. A process according to claim 8 wherein the zone agitators are turbine agitators and the ratio of axial agitator dimension to axial zone dimension in the reactor is greater in the lower zones than in the upper zones.

11. A process according to claim 10 wherein said ratio in the upper 15-25% of the total length of the reactor is in the range of about 0.1-0.2:1, in the lower 15-25% is about 0.2-0.6:1, and in the central zones, comprising the remainder of the reactor length, is about 0.15-0.25:1.

12. A process according to claim 11 wherein the zones in about the lower 15-25% of total reactor length have an axial dimension about twice that of the other zones in the reactor.

13. A process according to claim 12 wherein the ratio of agitator to zone dimension in said lower zones is about 0.2-0.3:1.

14. A process according to claim 6 wherein counter-current flow of feed solution and oxygen is employed.

15. A process according to claim 6 wherein the monohydroxyaromatic compound is 2,6-xylenol.

16. A process according to claim 6 wherein the catalyst contains at least one secondary alkylene diamine and at least one tertiary monoamine.

17. A process according to claim 16 wherein the secondary alkylene diamine is N,N'-di-t-butylethylenediamine and the tertiary monoamine is dimethyl-n-butylamine.

18. A process according to claim 17 wherein the catalyst additionally contains at least one secondary monoamine.

19. A process according to claim 18 wherein the secondary alkylene diamine is N,N'-di-t-butylethylenediamine, the tertiary monoamine is dimethyl-n-butylamine and the secondary monoamine is dimethylamine or di-n-butylamine.

20. A process according to claim 19 wherein the reaction mixture also contains a phase transfer catalyst.

21. A process according to claim 20 wherein the monohydroxyaromatic compound is 2,6-xylenol.

22. A process according to claim 5 wherein the catalyst additionally contains at least one secondary monoamine.

23. A process according to claim 22 wherein the manganese complex is a benzoin oxime complex.

* * * * *